United States Patent
Dykes

(10) Patent No.: US 10,795,992 B2
(45) Date of Patent: *Oct. 6, 2020

(54) SELF-ADAPTIVE APPLICATION PROGRAMMING INTERFACE LEVEL SECURITY MONITORING

(71) Applicant: ArecaBay, Inc., Los Altos Hills, CA (US)

(72) Inventor: Robert Dykes, Los Altos Hills, CA (US)

(73) Assignee: Areca Bay, Inc., Los Altos Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,437

(22) Filed: Sep. 16, 2019

(65) Prior Publication Data
US 2020/0012785 A1 Jan. 9, 2020

Related U.S. Application Data

(63) Continuation of application No. 16/234,104, filed on Dec. 27, 2018, now Pat. No. 10,452,843.

(Continued)

(51) Int. Cl.
*G06F 21/55* (2013.01)
*G06N 20/00* (2019.01)
*G06F 21/62* (2013.01)

(52) U.S. Cl.
CPC ............ *G06F 21/552* (2013.01); *G06F 21/62* (2013.01); *G06N 20/00* (2019.01); *G06F 2221/031* (2013.01); *G06F 2221/2113* (2013.01)

(58) Field of Classification Search
CPC .. G06F 21/552; G06F 21/62; G06F 2221/031; G06N 20/00
See application file for complete search history.

(56) References Cited

U.S. PATENT DOCUMENTS 8,725,973 B2 * 5/2014 Prahlad ............... G06F 11/1453
711/162
8,756,617 B1 * 6/2014 Boodman .......... G06Q 30/0609
719/328

(Continued)

FOREIGN PATENT DOCUMENTS

WO 2014/138388 9/2014
WO 2014138388 A3 9/2014

OTHER PUBLICATIONS

STIC Search Strategy for Search Assistance performed on Jun. 18, 2020.*

(Continued)

*Primary Examiner* — Sharon S Lynch
(74) *Attorney, Agent, or Firm* — Carmen C. Cook

(57) ABSTRACT

Systems and methods for providing visibility in application transactions between users and an application. In some embodiments, an application security microscope is deployed at network locations to capture and analyze application transaction data and to identify API call data. The application security microscope includes an API classifier to classify captured API call data. The API classifier generates API specifications which are then used to aid in the capture and identification of API call data in the application transaction data, thereby improving the capture efficiency and accuracy of policy actions.

19 Claims, 10 Drawing Sheets

Related U.S. Application Data

(60) Provisional application No. 62/616,316, filed on Jan. 11, 2018.

(56) References Cited

U.S. PATENT DOCUMENTS

| | | | | |
|---|---|---|---|---|
| 8,819,629 | B2* | 8/2014 | Sherrill | G06F 8/73 717/123 |
| 8,949,792 | B2* | 2/2015 | Paterson | G06F 11/3664 714/38.1 |
| 9,015,730 | B1* | 4/2015 | Allen | G06F 9/541 719/310 |
| 9,098,333 | B1* | 8/2015 | Obrecht | G06F 9/50 |
| 9,667,704 | B1* | 5/2017 | Sonawane | H04L 67/10 |
| 9,936,005 | B1* | 4/2018 | Palladino | H04L 67/10 |
| 9,954,879 | B1* | 4/2018 | Sadaghiani | G06F 16/285 |
| 10,122,757 | B1* | 11/2018 | Kruse | H04L 63/10 |
| 10,225,330 | B2* | 3/2019 | Palladino | H04L 67/1004 |
| 10,360,082 | B2* | 7/2019 | Lincoln | G06F 9/541 |
| 10,656,973 | B2* | 5/2020 | Park | G06N 20/00 |
| 2008/0016339 | A1* | 1/2008 | Shukla | G06F 21/566 713/164 |
| 2011/0264961 | A1* | 10/2011 | Hong | H04L 43/50 714/38.1 |
| 2012/0215911 | A1* | 8/2012 | Raleigh | H04M 15/66 709/224 |
| 2013/0152047 | A1* | 6/2013 | Moorthi | G06F 11/368 717/124 |
| 2014/0040863 | A1* | 2/2014 | Hale | G06F 8/36 717/123 |
| 2014/0259094 | A1* | 9/2014 | Narayanaswamy | H04L 47/20 726/1 |
| 2014/0289699 | A1* | 9/2014 | Paterson | G06F 11/3664 717/106 |
| 2015/0169385 | A1* | 6/2015 | Allen | G06F 9/54 719/328 |
| 2015/0350174 | A1* | 12/2015 | Reno | H04L 67/10 726/3 |
| 2016/0036722 | A1* | 2/2016 | Obrecht | G06F 21/554 709/226 |
| 2016/0057107 | A1* | 2/2016 | Call | H04L 63/02 726/11 |
| 2017/0012838 | A1* | 1/2017 | Kashtan | H04L 41/0273 |
| 2017/0124210 | A1* | 5/2017 | Suter | G06N 20/20 |
| 2017/0353477 | A1* | 12/2017 | Faigon | G06N 7/005 |
| 2018/0278651 | A1* | 9/2018 | Narayanaswamy | H04L 47/20 |
| 2018/0278653 | A1* | 9/2018 | Narayanaswamy | H04L 67/306 |
| 2018/0285170 | A1* | 10/2018 | Gamon | G06N 7/005 |
| 2018/0285887 | A1* | 10/2018 | Maung | G06Q 10/0635 |
| 2018/0367575 | A1* | 12/2018 | Narayanaswamy | H04L 63/12 |
| 2019/0020668 | A1* | 1/2019 | Sadaghiani | G06F 16/285 |
| 2019/0037005 | A1* | 1/2019 | Palladino | H04L 67/10 |
| 2019/0188317 | A1* | 6/2019 | Kashyap | G06F 16/3344 |
| 2019/0196796 | A1* | 6/2019 | Bahrami | G06F 9/54 |
| 2019/0243692 | A1* | 8/2019 | Lincoln | G06F 9/541 |
| 2019/0325074 | A1* | 10/2019 | Ghezzi | G06F 8/36 |
| 2020/0065160 | A1* | 2/2020 | Park | G06F 8/36 |
| 2020/0097338 | A1* | 3/2020 | Dhondse | G06K 9/6218 |

OTHER PUBLICATIONS

Search Report from IP.com (performed on Jun. 20, 2020).*
International Search Report, Application No. PCT/US19/12084, dated Apr. 15, 2019, pp. 1-8.
International Search Report and Written Opinion for International Application No. PCT/US2019/012084, dated Apr. 15, 2019, 8 pgs.

* cited by examiner

SELF-ADAPTIVE APPLICATION PROGRAMMING INTERFACE LEVEL SECURITY MONITORING

CROSS REFERENCE TO RELATED APPLICATIONS

This application is a continuation of U.S. patent application Ser. No. 16/234,104, filed Dec. 27, 2018, which claims priority to U.S. Provisional Patent Application No. 62/616,316, entitled APPLICATION SECURITY MICROSCOPE, filed Jan. 11, 2018, which is incorporated herein by reference for all purposes.

FIELD OF THE INVENTION

This present inventive concept relates to network security monitoring, and more particularly to monitoring and classifying application programming interface (API) transaction data to enable monitoring of API activities to realize protection from security risks associated with the use of APIs.

BACKGROUND OF THE INVENTION

Private individuals and businesses increasingly rely on network interconnectivity to conduct their business and transfer more and more data over the Internet. In a typical enterprise setting, service components of an enterprise application (commonly referred to as an "App") communicate over a data network. The data input/output and instructions to perform a specific business function are collectively called application network transactions, and such transactions often contain business information and user identities of a sensitive and private nature. Consequently, network security to prevent unauthorized access to sensitive data contained in these application transactions is becoming increasingly important.

To ensure network security, enterprise settings have traditionally used Deep Packet Inspection (DPI) devices. These devices are sometimes used for Intrusion Detection and Prevention (IDS/IPS) and sometimes used as a Web Application Firewall (WAF), but in either case they rely on what is called a protocol specification to interpret transactions on a network. For example, firewalls such as Palo Alto Network's "Next Gen" firewall leverages frequently updated patterns in the network flow to identify application traffic in support of features like "App ID," which attempts to identify the category of applications traversing a network. While these implementations of network packet inspection may provide support to basic standard protocols such as HTTP and HTTP-based applications, existing WAF's and other application protection mechanisms are quickly becoming inadequate as hacking of applications becomes more sophisticated, often masking instructions made over the networks to appear as legitimate instructions to any conventional network security monitors.

Additionally, enterprise applications continue to expand into the cloud environment, where conventional network security monitors lack the capability to provide sufficient visibility. Most conventional network security monitors are unable to provide fine grain security control at the application programming interface (API) level unless a machine-readable definition of the API is available. Sometimes an application developer will provide this definition, but more often than not a system administrator must perform an analysis of the application transaction before the application API can be properly classified. Classifying the application API can be difficult for system administrators as the application is often changed or updated before the classification can be completed. Since conventional network security monitors are not capable of handling changing application APIs, some enterprises have decided to rely on API security tools built into the application code itself.

Although API security tools built into the application code benefit from full access to the application, and are fairly effective in monitoring application transactions internally, these embedded tools are often unwieldy and difficult to deploy, requiring certain custom libraries to be integrated into the application, limiting the developer's flexibility in choosing the platform that fits their needs. In an enterprise setting, application development and security operation generally are and should be separated, to ensure that application developers select the best tools and programming languages to optimize an application. Otherwise, the demands of security operations could stunt the growth of an application in its development process.

Last but not least, while traditional application architecture uses a monolithic application architecture including only a single front-end interface, emerging enterprise application architecture increasingly applies a hybrid model including microservice architectures and legacy applications. Modern advance enterprise application architecture often puts emphasis on a network or a mesh of application instances rather than relying on a few static application service hosts. As built-in application monitors are not effective in monitoring inter-instance communications, application solutions built-in to the code or the platform are becoming obsolete in a modern enterprise application architecture.

Additionally, conventional network monitors follow a set of predefined rules that, once loaded, do not change in operation, further slowing the development process.

BRIEF DESCRIPTION OF THE DRAWINGS

Various embodiments of the invention are disclosed in the following detailed description and the accompanying drawings.

DETAILED DESCRIPTION

Figure 1:
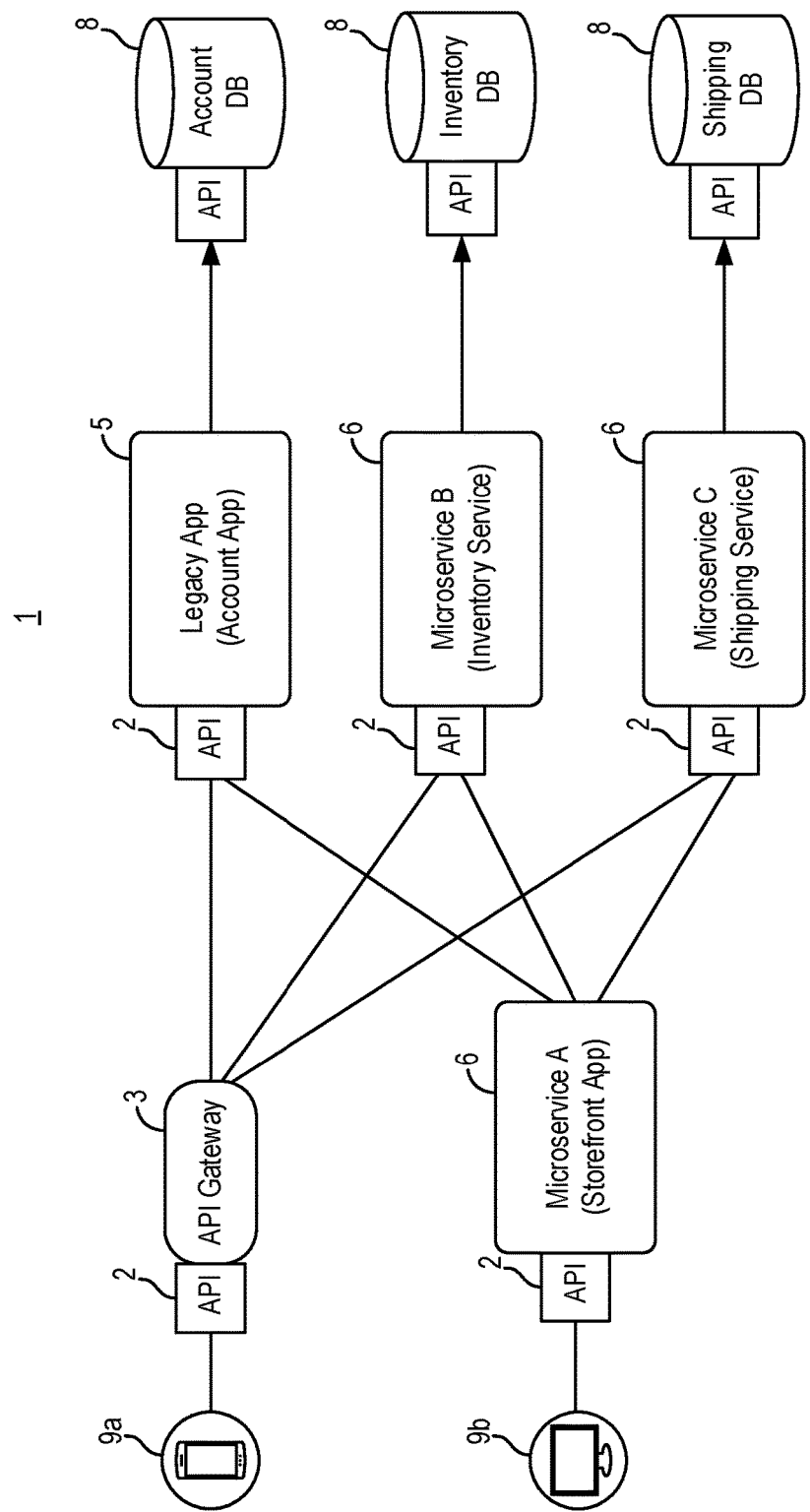
FIG. 1 is a block diagram illustrating an enterprise application architecture and the in-App activity flow in some examples.

In embodiments of the present invention, an application security microscope is deployed to capture and analyze application transaction data transferred to an application in application network transactions. The application security microscope identifies application programming interface (API) call data in the application transaction data and classifies the API call data without having prior knowledge of the application or the description of the API used to access the application. In some embodiments, the application security microscope classifies the API call data to reconstruct the application transaction structure to enable security policy to be implemented. As thus configured, the application security microscope provides visibility in the use of application programming interfaces (APIs) and enables effective implementation of API security.

In the present description, an application programming interface (API) refers to a software architecture element that facilitates interaction between software applications or distinct computer systems. In general, an API includes two elements: a specification that describes the possible interactions between software applications or between distinct computer systems and a software interface that publishes the specification. The specification of the API describes how information can be exchanged between applications, such as the request for processing and data delivery protocols. An API can include a set of protocols, routines, functions and/or commands to facilitate communication between software applications or distinct computer systems.

In embodiments of the present invention, the application security microscope includes two functional elements: a data receptor component and a data processor component. The data receptor is configured to access application transaction data to capture real-time API call level data without any modification to the applications or the applications' runtime. The data processor is configured to perform API data classification and may further perform application security control functions, such as anomaly detection and applying policy actions.

In some embodiments, the application security microscope is implemented as a software component and may be deployed at one or more network locations to track the application transaction data for security monitoring. In other embodiments, the application security microscope is implemented as separate software components including a central security data processor and one or more local data receptors (also referred to as micro-sensors). The local data receptors are light-weight software components deployed at one or more network locations to access application transaction data and to provide captured API call level data to the central security data processor. The central security data processor is a software component for performing API data classification and application security control. The central security data processor can be implemented at an enterprise's on-premises data network or at an off-premises data network. In the present description, the application security microscope, including the data receptor and the data processor, or the local data receptor are sometimes collectively referred to as an "API sensor" for sensing or detecting application transaction data. That is, as used herein, an "API sensor" refers to a component including the data receptor functions for capturing application transaction data and identifying API call data or API transaction data. The API sensor may further include data processing function forming the application security microscope or the API sensor may be a local data receptor, or micro-sensor, including only API data capture functions.

The application security microscope of the present invention is particularly useful in enterprise applications employing many exposed APIs to provide access to the applications and to business data. The increasing use of APIs in enterprise applications to provide access to applications and to business and user data leads to an increase in security risks, such as from API abuses. In the present description, an enterprise application (sometimes referred to as an "App") includes service components that communicate over a data network and the data input/output and instructions to perform a specific business function. The service components, the data input/out and instructions are collectively referred to as application network transactions. The application network transactions often contain sensitive business information and user identity information. In some examples, the application network transactions include API calls made to the exposed APIs of the enterprise application. In the present description, the application security microscope accesses the application transaction data to identify API call level data for implementing security monitoring.

In operation, the application security microscope of the present invention captures the application transaction data to identify API call level data and classifies the API call level data to generate API specifications. The API specifications thus generated are provided to the data receptors, which can be deployed locally, to enable the data receptors to capture API call data from subsequent application transaction data accurately. The classification and API specification generation process are carried out iteratively so that the API specifications used by the data receptors are continuously updated by the classification process to ensure highly accurate API data capture and security monitoring. The API specifications thus generated can also be used in applying precise security policy action against highly targeted data fields and transactions.

As described above, the traditional enterprise application architecture uses a monolithic application architecture including only a single front-end interface. The traditional monolithic application architecture is no longer favored. Instead, emerging enterprise application architectures apply a hybrid model which may include microservice architectures and legacy applications. Emerging enterprise application architecture often includes a mix of RESTful web interfaces, API gateways, containerized microservices and serverless functions. The user in-App activity flow of these enterprise applications often includes multiple API calls from the application front-end to the application backend, between legacy application and microservices. The entire user in-App activity flow needs to be secured in order to secure the network transaction end-to-end. In the present description, "in-App" activity flow refers to the network activity within an enterprise application.

FIG. 1 is a block diagram illustrating an enterprise application architecture and the in-App activity flow in some examples. Referring to FIG. 1, an enterprise application 1 may be implemented using a hybrid architecture including a legacy application 5 and one or more microservices 6. The legacy application and the microservices may be loosely coupled and collaborating, each service providing a set of narrowly defined functions. For example, the enterprise application 1 may include a legacy application 5 implementing a user account application service, a microservice A implementing a storefront application service, a microservice B implementing an inventory service, and a microservice C implementing a shipping service. The services may access one or more databases 8. In one example, each service has its own database, such as an account database, an inventory database, and a shipping database. In other example, a single database may be used for all the services.

The enterprise application 1 uses an API gateway 3 and the microservice A to expose APIs for user to access the enterprise application. The services communicate with each other and with the database 8 also using API calls. As a result, an end-user action in the enterprise application includes a flow of API calls going through the application front-end to the legacy application backend or to the microservices. There are challenges to monitor and secure the application network transactions for the enterprise application end-to-end. Furthermore, due to the large number of APIs being used, it is often not practical or feasible to obtain documentation for all of the APIs and to manually manage all of the APIs being used in the enterprise application.

FIG. 1 illustrates a representative application architecture and is provided to illustrate the emerging application architecture and the use of API calls through the in-App activity flow. FIG. 1 is illustrative only and is not intended to be limiting. It is understood that modern enterprise applications can be implemented using many different application architectures. In other examples, an enterprise application may be an application hosted on a cloud service and may provide user access to data stored on a cloud database. More importantly, the application security microscope of the present invention can be implemented in any enterprise application architecture to provide monitoring and security functions. The particular application architecture being used is not critical to the practice of the present invention.

Figure 2:
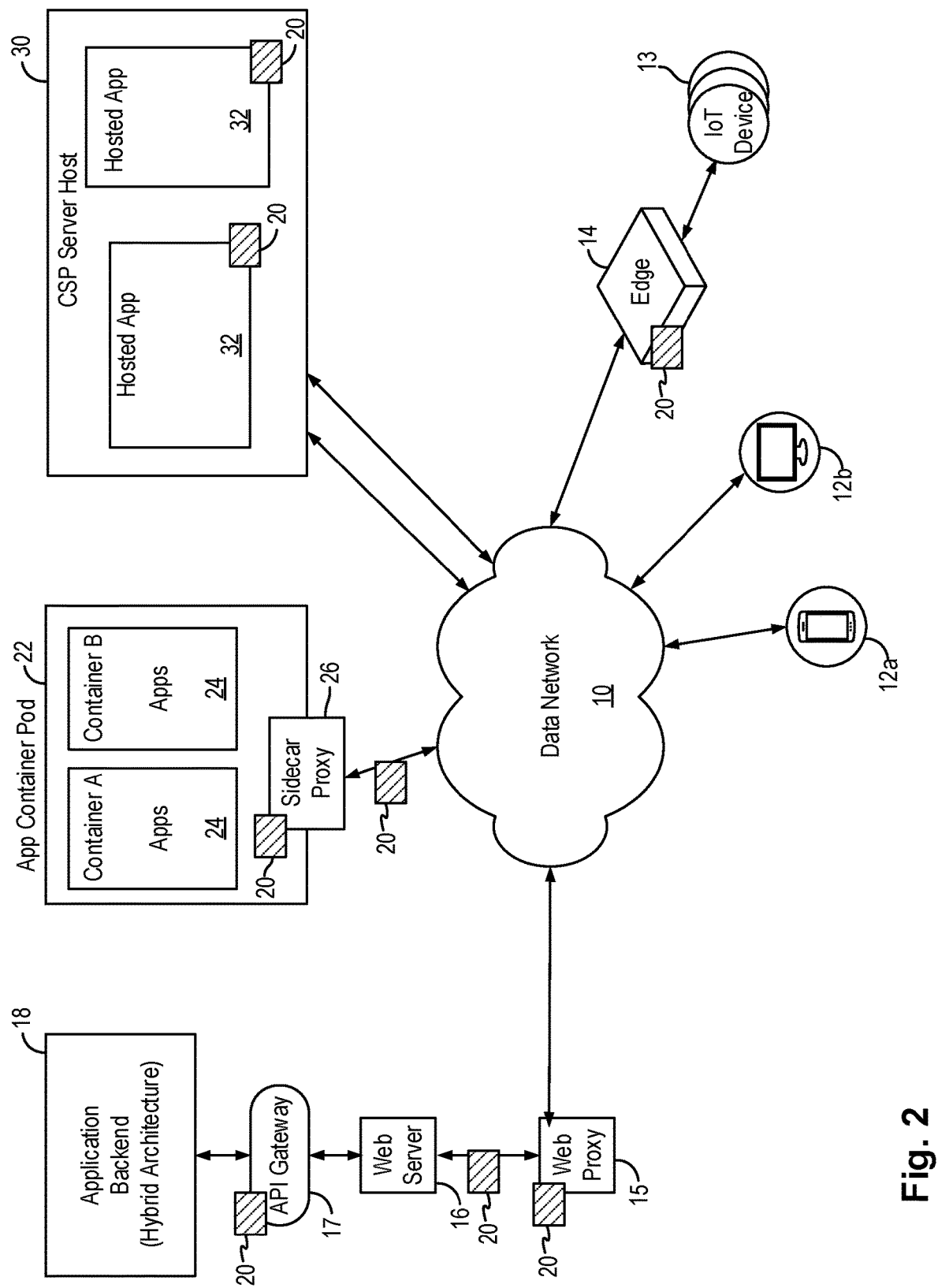
FIG. 2 illustrates representative enterprise application environments in which the application security microscope can be implemented and the various deployment implementation that can be used in some embodiments.

In embodiments of the present invention, the application security microscope is deployed at one or more network locations to monitor and secure enterprise applications using APIs both for user front-end access and for in-App communications. FIG. 2 illustrates representative enterprise application environments in which the application security microscope can be implemented and the various deployment implementation that can be used in some embodiments. More specifically, FIG. 2 illustrates several representative enterprise application environments where an enterprise can make their enterprise applications available or accessible to users. Users access the enterprise applications through a data network 10, such as the Internet or other private or public data networks. For example, the users may access the enterprise applications using a mobile device 12a, such as a mobile phone or a tablet, or a computing device 12b, such as a laptop computer or a desktop computer. Alternately, the enterprise applications may be configured to work with Internet of Things (IoT) devices 13. Internet of Things devices 13 may communicate with an edge device 14, such as a communication hub, which communicates with the enterprise applications through the data network 10. FIG. 2 illustrates some examples of enterprise application environments and user devices for accessing the enterprise applications. FIG. 2 is representative only and not intended to be limiting.

Referring to FIG. 2, in a first application environment, the enterprise application is implemented using a web proxy 15 coupled to a web server 16 which is then coupled to an API gateway 17 to provide access to the enterprise application. The API gateway 17 provides access to the enterprise application backend 18. The enterprise application backend 18 may be implemented using hybrid application architecture or any other suitable application architecture. Part or all of the application components, i.e. the web proxy 15, the web server 16, the API gateway and the application backend 18, may be deployed on-premises of the enterprise's own data network or may be deployed off-premises at a private data network or using a cloud service infrastructure. The exact implementation or configuration of the enterprise application is not critical to the practice of the present invention. The first application environment illustrates the application front-end providing API access to the application backend providing services, such as business functions. The first application environment may include multiple exposed API that needs to be secured against attack. Users access the application backend 18 through API calls made through the API gateway 17.

In a second application environment, the enterprise applications are implemented using application containers 24. In the present description, an "application container," also known as a "software container," refers to a computing structure or computing construct where one or more applications are isolated in a self-contained area in an operating environment. An application container (or "app container" or "container") packages an application with all of its dependencies into a standardized unit of software. Application containers, containing one or more applications, can be built or developed without regard to the operating system or platform. Application containers can further be transported across different infrastructures and be deployed to run in various computing environments. An application that is formed inside a container is sometimes described as a "containerized" application. In the present illustration, containerized applications are implemented in one or more application containers 24, including container A and container B. The containers A and B may be grouped in a pod, such as an application container pod 22. In other words, an application container pod 22 includes a collection of containers, such as containers A and B, and each container includes one or more containerized applications. A special purpose web proxy 26, also referred to as a "sidecar proxy," provides access to the containerized applications.

In a third application environment, the enterprise applications are implemented as hosted applications 32 hosted by a cloud service provider in a cloud server host 30. For example, an application may be hosted by a private cloud service provider such as a colocation hosting provider. In one example, an application may be hosted by Amazon Web Services (AWS).

Regardless of the specific application environment, user actions at the applications generate a flow of API calls from the application front-end to the application backend. According to embodiments of the present invention, API sensors 20 for capturing API call data can be deployed at various locations to monitor and secure the applications by providing end-to-end API security. As described above, an API sensor 20 refers to a software component configured as an application security microscope or a local data receptor, where the local data receptor is coupled and collaborating with a central data processor.

In some embodiments, the API sensor 20 can be deployed as proxy extensions, as network taps, at the edge devices, as sidecar containers, or as message bus consumers. API sensors 20 may be deployed using various deployment models. In one embodiment, the API sensors are deployed as virtual network appliances. The API sensors may be deployed as a network tap or proxy extensions. Alternately, plug-ins can also be used to extract API call data from API gateways. The API sensors may be deployed on-premises of the enterprise data network, such as at the edge of the enterprise data network. the API sensors may also be deployed off-premises of the enterprise data network.

In another embodiment, the API sensor 20 may be deployed as an additional sidecar container as part of the target pod 22 containing containerized applications. The API sensor 20 may be deployed inside or outside the pad, such as on the message bus between the pods. In one embodiment, the API sensor 20 is implemented using a sidecar service. As used herein, a "sidecar service" or a "sidecar container" refers to a software component that is independent of the application, that is, not part of the application, but is connected to the application. A sidecar shares the same lifecycle as the application and its proximity to the application allows the sidecar service access to the same resources of the application. A sidecar service may actively participate in the application flow. In the present embodiment, the API sensor 20 is implemented as a sidecar service which is application independent but share the same lifecycle of the application the API sensor is protecting. Furthermore, in the present embodiment, the sidecar service or the sidecar container is implemented without requiring changes to the application codes or the runtime environment of the target containerized applications.

In yet another embodiment, the API sensor 20 may be deployed within the same infrastructure hosting the enterprise application. The API sensor 20 may be auto-deployed with the deployment of the enterprise application within the cloud server host. For example, the enterprise application may be hosted within a virtual private cloud of the cloud service provider. In one example, an application is hosted by Amazon Web Services (AWS) and the API sensor 20 is deployed as a simple virtual network device between the Load Balancer and the web server in the cloud server host.

In some embodiments, the API sensor 20 can be implemented as a serverless function supported by the application. For example, the API sensor 20 can be deployed as a traditional Lambda function for AWS cloud service or as a Cloud Front Lambda edge function.

Finally, in another embodiment, the API sensor 20 may be deployed at the edge device or edge computing devices servicing one or more Internet of Things devices.

FIG. 2 illustrates some representative deployment options for the application security microscopes and/or the local data receptors in embodiments of the present invention. FIG. 2 is illustrative only and is not intended to be limiting. It is instructive to note that the API sensors 20 can be deployed at many applicable network locations in various configurations to perform the functions of API call data capture and, in some embodiments, to apply network security action based on classified API call data.

As described above, in some embodiments, the application security microscope may be implemented using a local data receptor component for capturing the API data at the application being hosted by a cloud service provider and an off-line central security data processor for processing and classifying the API data. The local data receptor is sometimes referred to as an in-line data receptor. One or more in-line data receptors may be deployed to capture application transaction data at one or more applications or application instances and identify API call data in the application transaction data. The in-line data receptors provide captured API call data to the central security data processor. The central security data processor performs the classification of the API call data and implements security policy based on the classification. In this manner, the central security data processor can receive API call data from multiple in-line data receptors and improve the classification accuracy by performing cross-session correlation. It is noteworthy that the word "in-line" is used to illustrate the fact that the local data receptor has visibility to real-time transaction data. It does not mean that the receptor has to be implemented as a "proxy" in which case application data must first be received and then retransmitted to the original destination, potentially impacting network performance. In embodiments of the present invention, the in-line data receptor is implemented as a data consumer without impacting actual data delivery performance.

Figure 3:
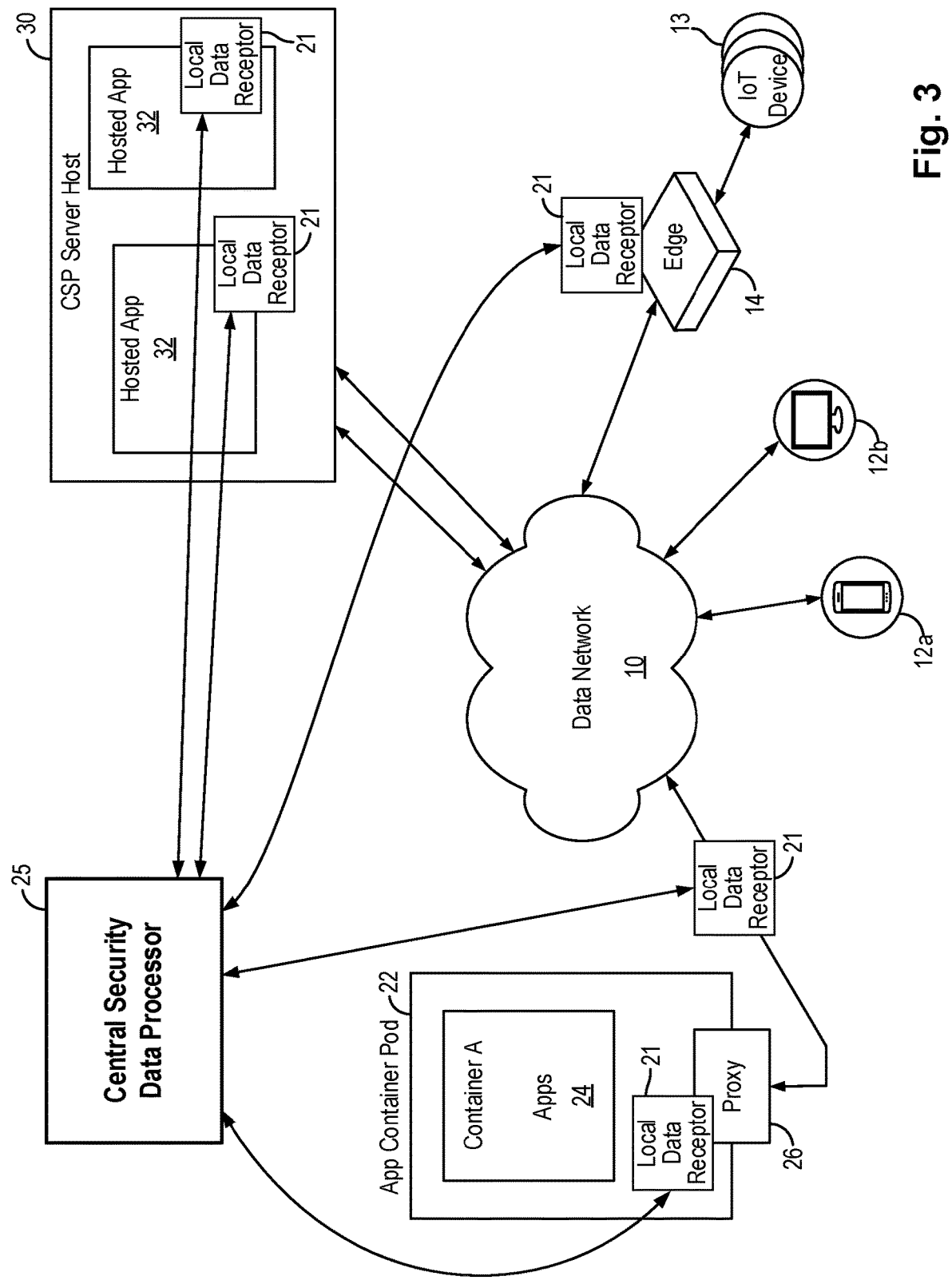
FIG. 3 illustrates an environment in which the API sensor is deployed as a local data receptor operating with a central security data processor in some embodiments.

FIG. 3 illustrates an environment in which the API sensor is deployed as a local data receptor operating with a central security data processor in some embodiments. Referring to FIG. 3, in the deployment models described above with reference to FIG. 2, the sensor 20 can be implemented as a local data receptor 21 configured to capture API call data. The local data receptor 21 can be deployed at the edge device 14, inside or outside the application container pod 22, or at a hosted application inside a cloud server host 30. The local data receptor 21 captures API call data that are then communicated to a central security data processor 25 for classification of the API and generation of the API specification, as will be described in more detail below. The central security data processor may also implement security policy based on the classification of the APIs. The central security data processor 25 further provides the generated API specification back to the local data receptors 21 to improve the data capture accuracy. The local data receptors 21 and the central security data processor 25 may communicate over the data network 10 or they may communicate using any other communication means.

The central security data processor 25 can be implemented within or on the premises of an enterprise's private data network. Alternately, the central security data processor 25 can be an off-premises component, deployed off the premises of the enterprise data network. For example, the central security data processor 25 may be hosted on a cloud server. The central security data processor 25 is typically associated with an enterprise deploying one or more enterprise applications. For security and privacy concerns, each enterprise typically implements its own central security data processor with an associated network of local data receptors.

Figure 4:
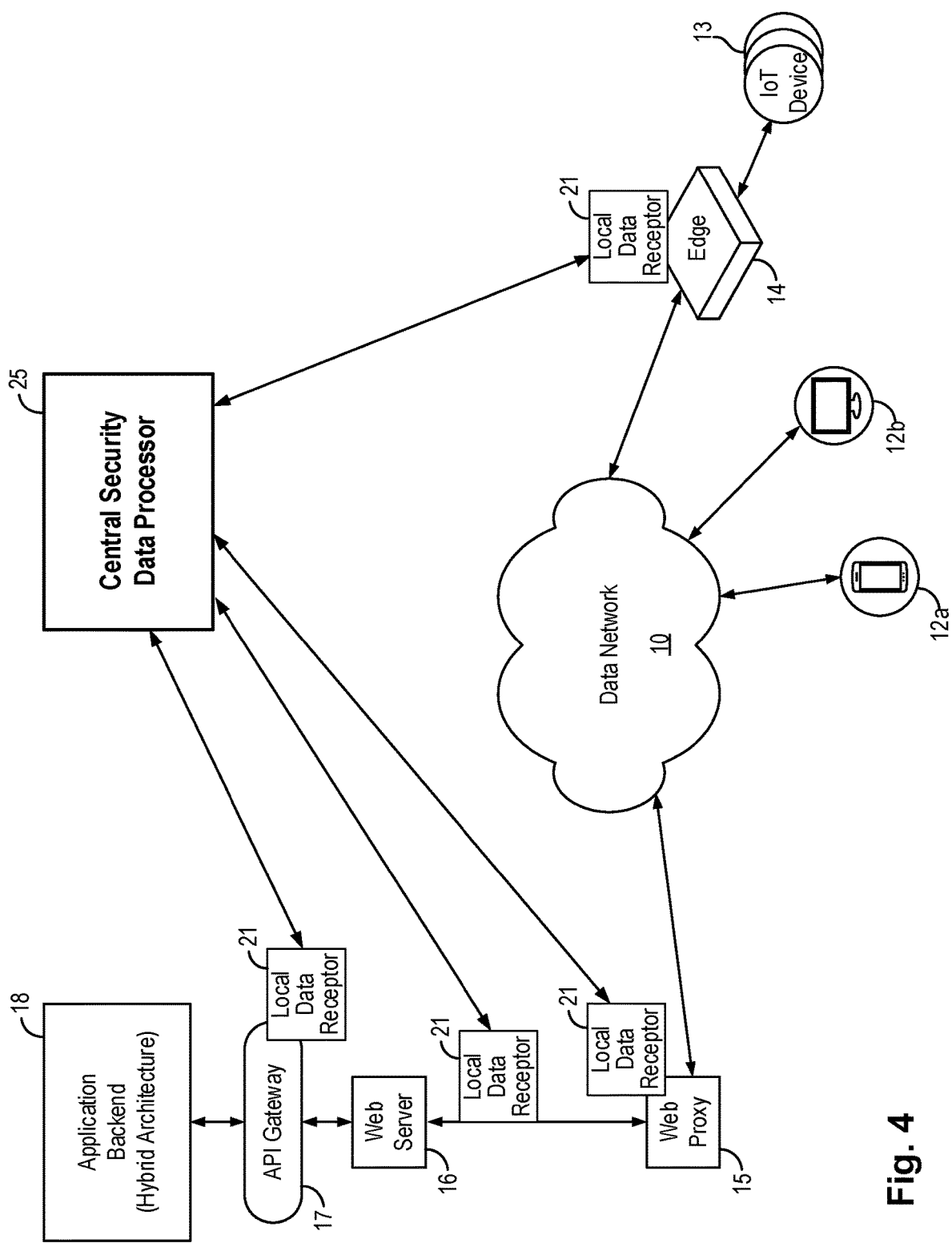
FIG. 4 illustrates an environment in which the API sensor is deployed as a local data receptor operating with a central security data processor in some embodiments.

FIG. 4 illustrates an environment in which the API sensor is deployed as a local data receptor operating with a central security data processor in some embodiments. Referring to FIG. 4, in the deployment model using API gateway described above with reference to FIG. 2, the sensor 20 can be implemented as a local data receptor 21 configured to capture API call data. The local data receptor 21 can be deployed at the web proxy 15 as a proxy extension, as network taps between the web proxy 15 and the web server 16, and at the API gateway 17. The local data receptor 21 captures API call data that are then communicated to a central security data processor 25 for classification of the API and generation of the API specification, as will be described in more detail below. The central security data processor 25 further provides the generated API specification back to the local data receptors 21 to improve the data capture accuracy. The local data receptors 21 and the central security data processor 25 may communicate over the data network 10 or they may communicate using any other communication means.

As thus configured in FIGS. 3 and 4, the application security microscope or the local data receptor of the present invention can be deployed at multiple segments of the application's activity flow. Therefore, API calls that are made in all segments of an application activity flow can be monitored and secured. Furthermore, API call data from multiple segments of the application activity flow can be correlated to enhance anomaly detection. For example, an API call at the application front-end can be correlated with an API call at the application back-end. For example, a security policy can be implemented to allow a backend session only when there is a corresponding valid front-end session. Such security policy can be used to prevent unauthorized direct access to backend components, such as a database, by someone who has obtained an administrator password, for example.

In the above-described embodiments, the users of the enterprise applications access the applications through the data network 10. The data network 10 may include, but is not limited to, a wide area network (WAN), such as the Internet, and/or a local area network (LAN). In operation, a user may wish to transfer data to the application by conducting application transactions. In non-limiting examples, users can be end users, such as employees of a company who use an enterprise application for its intended functionality in the ordinary course of their business, and/or they can be test users whose task is to verify the functionality of an application with or without guidance of a security administrator. Users do not need to be human; an automated endpoint user application can also function as a user. In some other cases, a program running inside a device (for example, an Internet of Things device) can also function as a user to an application. The user and security administrator may each be operating computer system or devices capable of being connected to the data network 10, e.g., a desktop computer, a laptop computer, a mobile phone, a tablet computer, or an IoT device, and the like. The system or device need not be physical hardware. In some cases, the system or device can be software and/or a virtual machine.

In some embodiment, the enterprise application can be running a cloud-based enterprise application accessible over the data network by the user. The application may be run in an application server hosted by a cloud service provider.

As described above, an enterprise application may include an in-App activity flow that includes multiple API calls. The in-App activity flow can include API call segments connecting different kinds of application services, each application service having its own lifecycle. The application services may run on different platforms across boundaries of public/private clouds. Furthermore, the APIs are usually custom built to expose functions of customized application services. The format standards and the schema of the API parameters are usually not well defined.

Figure 5:
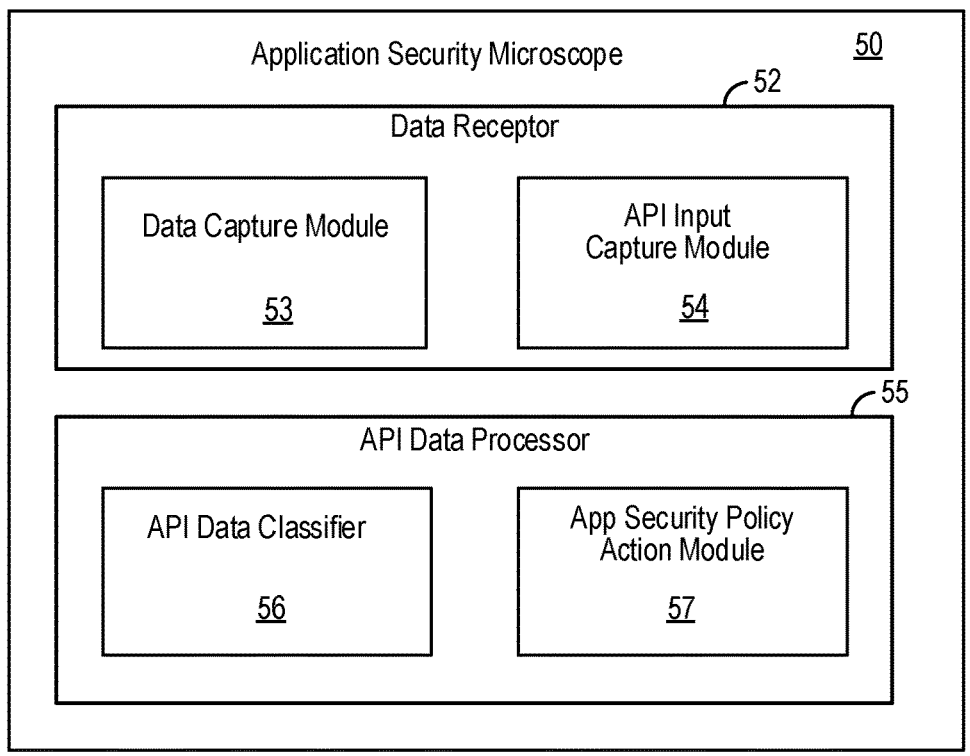
FIG. 5 is a block diagram of an application security microscope in some embodiments.

According to embodiments of the present invention, the application security microscope is applied to track real-time API calls in heterogeneous application environments. FIG. 5 is a block diagram of an application security microscope in some embodiments. The application security microscope 50 is implemented as a software component built to access real-time API call data without any modification to the applications or the application's runtime. The application security microscope 50 include two major components: a data receptor 52 and an API data processor 55. The data receptor 52 includes a data capture module 53 and an API input capture module 54. The API data processor 55 includes an API data classifier 56 and an App security policy action module 57. Each of the components or modules of the application security microscope 50 may be implemented as software, hardware, or a combination thereof. However, the present inventive concept is not limited thereto, and some or all of these components or modules may be implemented outside of a single instance of an application security microscope.

The data capture module 53 and the API input capture module 54 operate cooperatively to identify and capture API call data from application transaction data. In some embodiments, the API input capture module 54 identifies API call data in the application transaction data using pre-defined API specifications, which are generated by the API data processor 55. The API call data captured by the data receptor 52 is provided to the API data classifier 56 which operates cycles of continuous self-adaptive API learning. The API data classifier 56 learns the constructs of the API and generates an API specification (or "API spec"). The API spec is then used by the App security policy action module 57 to implement appropriate security policy, such as to detect anomalies and to enforce advanced security policies. In some embodiments, the API spec and any applicable security rules or security measures are provided to the data receptor 52 which uses the API spec to monitor the incoming API calls and to apply policy action. In some embodiments, the API classification and API spec generation form a closed loop automated cycle, making the process self-adaptive to API changes.

Figure 6:
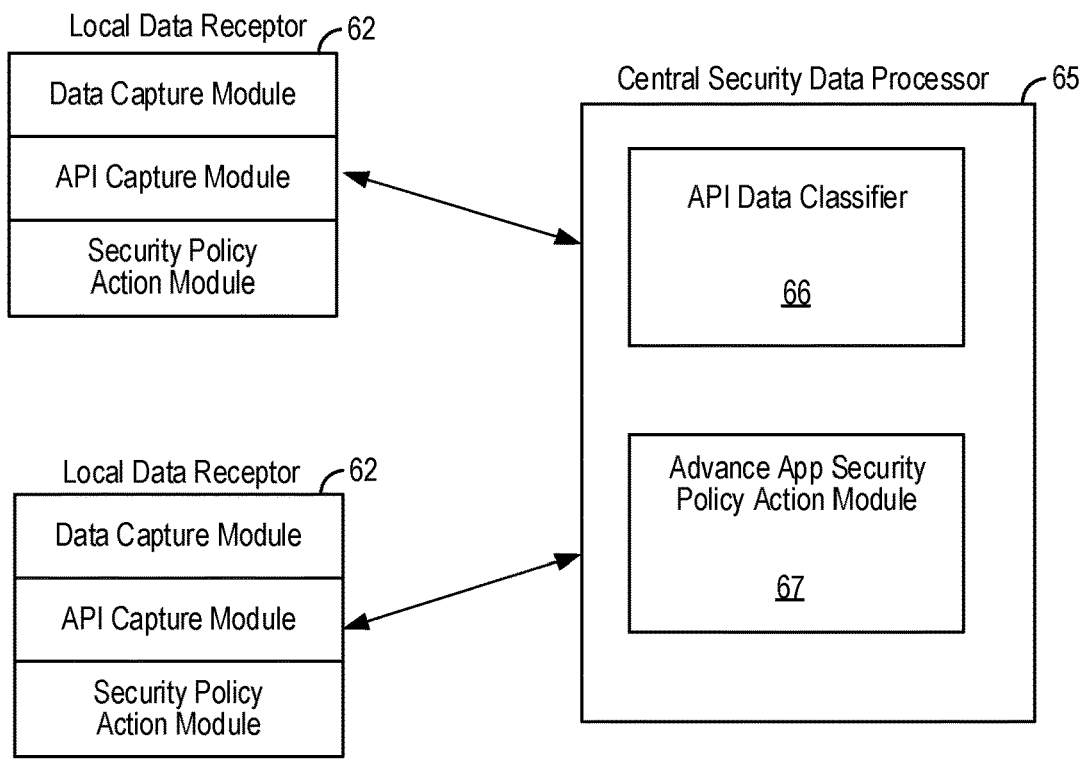
FIG. 6 is a block diagram of an application security microscope implemented as one or more local data receptors communicating with a central security data processor in some embodiments.

FIG. 6 is a block diagram of an application security microscope implemented as one or more local data receptors communicating with a central security data processor in some embodiments. In the present example, a central security data processor 65 implements the API classifier 66 and an advanced Application security policy action module 67. The API Classifier 66 may be a virtual machine running a single application security microscope instance, or a hardware general purpose server. The central security data processor 65 is associated with one or more local data receptors 62, which is also referred to as in-line data receptors. The local data receptors implement the data capture module, the API input capture module, and an App security policy action module. The central security data processor is connected to the one or more local data receptors to receive API data across applications and across connection sessions.

As thus configured, the local data receptors 62 can be implemented as light-weight software components that can be deployed at various network locations to monitor network transaction data and to capture API call data. The captured API call data is provided to the central security data processor 65 to classify the API call, generate the API spec and any security policy on the API spec. The central security data processor 65 provides the API spec and any security policy rules to the local data receptors 62. The local data receptors 62 uses the API spec to identify and capture API call data and also applies security policy action on the identified API calls based on the API specifications. In this manner, the local data receptors and the central security data processor operate in a closed loop operation to identify API calls and to implement security policy rules.

Figure 7:
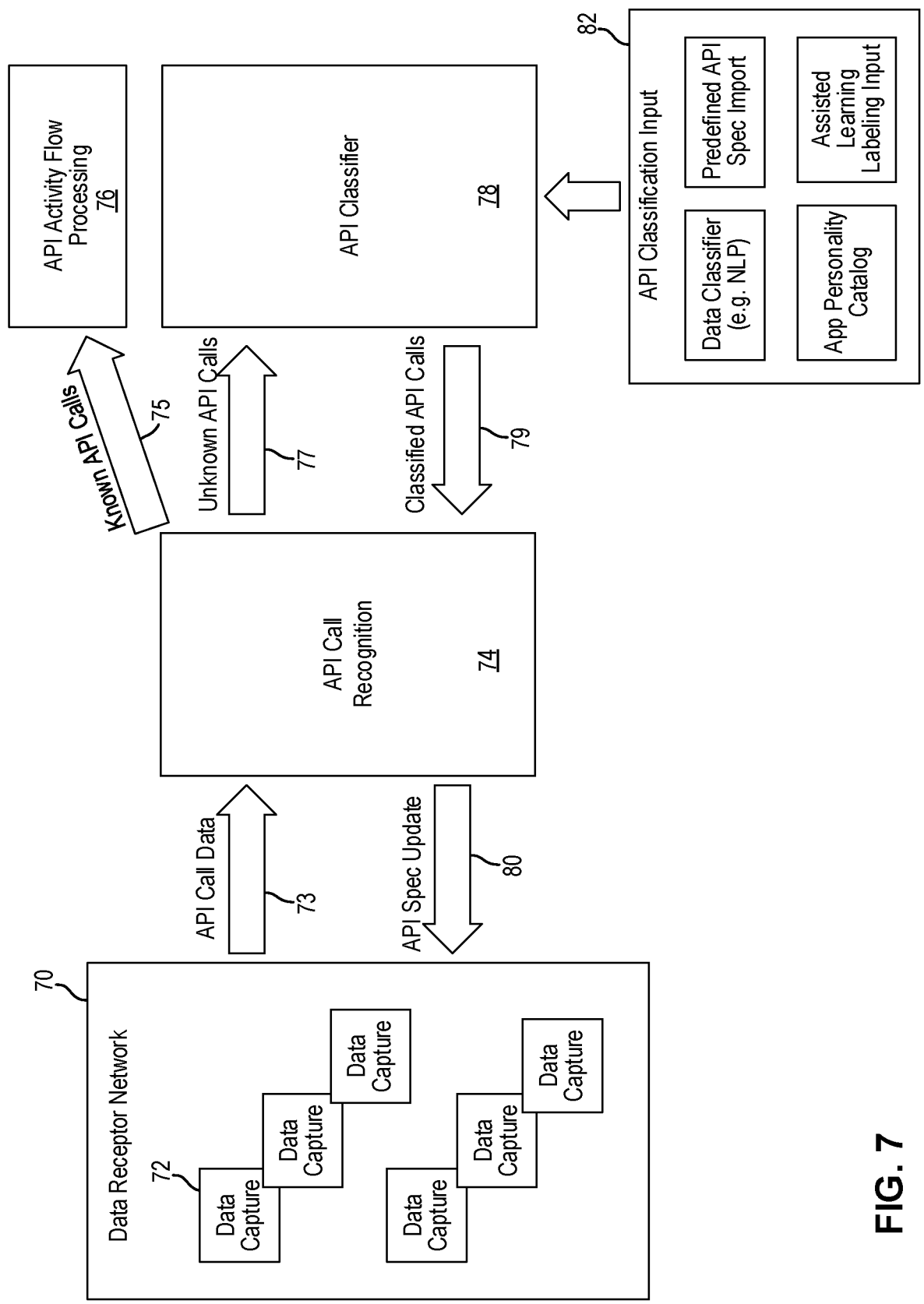
FIG. 7 is a block diagram illustrating the API call data capture and classification process in some embodiments.

FIG. 7 is a block diagram illustrating the API call data capture and classification process in some embodiments. Referring to FIG. 7, a network 70 of data receptors are deployed to monitor multiple segments of an application activity flow. In the present description, the data receptors may be local data receptors configured for API call data capture operation (FIG. 6) or the data receptors may be the data receptor component of an application security microscope including the API data processor (FIG. 5). Regardless of the data receptor configuration, the network 70 of data receptors are deployed at various network locations to monitor and capture API call data. Each data receptor implements the API data capture process 72 to identify and capture API data from the network transaction data.

In some embodiments, each data capture process 72 implements a spec engine which applies a set of dynamic rules to selectively capture real-time API call data according to API specifications generated from the API learning process. In the present embodiment, the API specifications (or API specs) is granular, resulting in highly efficient data capture. In one example, the spec engine is capable of filtering out more than 95% of the raw data in the network transaction data. For instance, within the network transaction data, the API call data may be 10s of kilobytes that are buried in megabytes of static content, such as JavaScript, CSS and images. The data capture process 72 parses the API calls and uses the spec engine to apply rules to identify API call activity and relevant data. The real-time extraction of highly selective data is the reason the data receptor can be constructed as light-weight software component.

As described above with reference to FIG. 2, the data receptor, whether local or part of the application security microscope, can be deployed using various deployment model. The data receptors can be network data receptors deployed as virtual network appliances in simple tap mode. The network data receptors can also be integrated into SSL terminating web proxies where API payloads are available. The network data receptors can also be implemented as plug-ins to extract API call data at API gateways. Alternately, the data receptors can be deployed as a container, such as a sidecar container, as part of the target pod. The data receptors can also be deployed as a message bus consumer to protect message-oriented applications. Finally, the data receptors can be implemented as serverless function supported by the application.

The data capture process 72 capture API call data from network transaction data. The API call data 73 is provided to the API learning process to generate the API specifications. In particular, the API learning process is a continuous close loop cycle where API call data captured by the data capture process 72 are used as input to the learning process to generate the API specifications. New API call data are used to improve the API specifications which will in turn be used to improve the capturing of relevant API data. In embodiments of the present invention, the API learning process includes components that may be implemented in the data receptor and in the API data processor of the application security microscope or in the central security data processor.

The API learning process includes an API call recognition process 74 and an API classifier process 78. In some embodiments, the API call recognition process 74 may be implemented at the data receptors. The API call data that are captured are matched against known API specifications. API calls that matched any API spec will be tagged with metadata labels to identify the API actions and corresponding parameters. Known API calls are then sent to the API activity flow processing module 76 for further correlation and policy enforcement. Unknown API call data 77 are sent to the API classifier process 78.

In some embodiments, the API classifier process 78 can be implemented at the API data processor. The API classifier 78 takes the API call data that does not match any known API specs and try to determine the API call construct. In some embodiments, the API classifier derives the meaning of the API call by traversing as deep as the payload including the data field keys and values aside from just the universal resource identifier (URI). The classification process at the API classifier 78 can be assisted by various data sources 82. For example, predefined API specifications can be imported into the API classifier. Automatic data classifier, such as using natural language processing and pattern recognition techniques, can be provided to assist in identifying data fields. Because APIs of applications performing similar functions follow similar patterns, an API personality catalog can be used to improve classification accuracy and efficiency. In some embodiments, the API specs of known applications are super-imposed on unknown API calls of applications sharing the same personality or similar functions. Finally, in some embodiments, data field labels may be provided using assisted learning labeling input. In some embodiments, the API classifier 78 applies machine learning algorithms to classify the API call data. Machine learning algorithms are known and will not be further described.

The API classifier 78 classifies the unknown API call data and generates an API specification for the unknown API call. The classified API calls 79 is provided to the API call recognition process 74 to enable identification of future API calls. Updates to the API specification 80 is also provided to the data capture process to improve accuracy and efficiency of future API call data capture. In this manner, a close loop process is realized where API data capture is performed based on API specifications generated by the API classifier which continuously provide updated API specification to improve the API data capture process.

Figure 8:
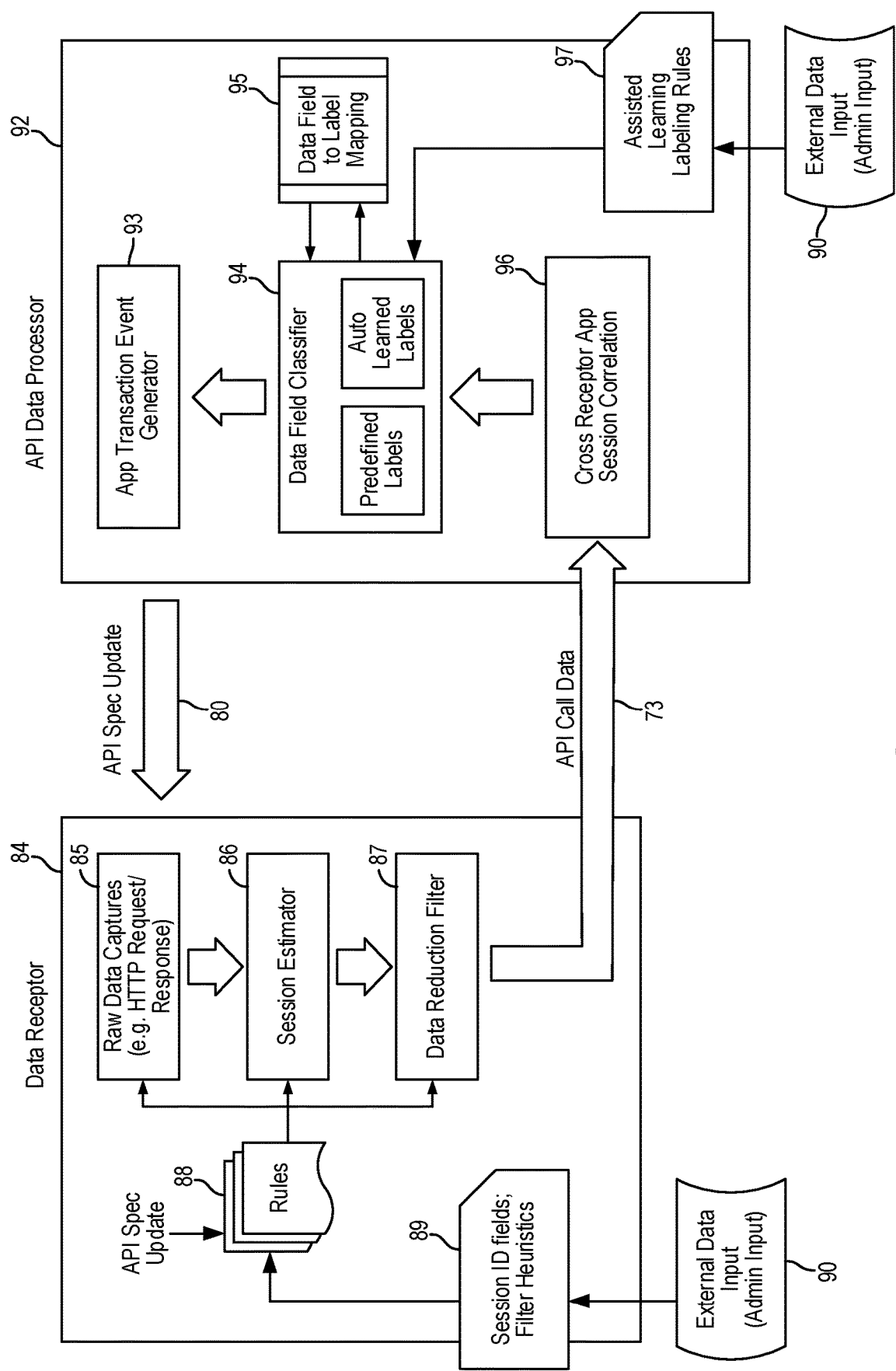
FIG. 8 illustrates a block diagram of an application security microscope in some embodiments and illustrating the processes within the application security microscope in some embodiments.

FIG. 8 illustrates a block diagram of an application security microscope in some embodiments and illustrating the processes within the application security microscope in some embodiments. Referring to FIG. 8, the data receptor 84, which may be implemented separate from or integrated with the API data processor 92, receives network transaction data and generates API call data. The data receptor 84 includes a raw data capture module 85 that receives and capture network transaction data. For example, the raw data capture module 85 capture HTTP request and responses in the network transaction data. The captured raw data is provided to a session estimator 86 to group the raw data and then to a data reduction filter 87. To implement the data capture and filtering process, the data receptor applies a set of rules 88 based on API specifications. In some cases, external data input can be provided to identify the session identifier fields or to change or modify the filter heuristics. The set of rules 88 are also updated by the API spec update generated by the API data processor. As thus configured, the data receptor 84 processes network transaction data and captures API call data 73 which are provided to the API data processor 92.

The API data processor 92 implements the API classification process which is iterative. The API classification process includes several feedback loops to refine its own rules or filters. The API classification process is configured to effectively filter the data capture down to ones that are most relevant to the goal of API protection. The API classification process is further configured to correlate API data across sessions so that application transactions are accurately tracked.

In the present embodiment, the API data processor 92 implements a cross receptor App session correlation module 96. In particular, an application transaction, or an application transaction event (also referred to as "App transaction"), has the notion of an App session and includes the key data transferred within the App session. The API classification process implements a data tracker where data field values or API transaction labels that are extracted from one App transaction and show-up in another App transaction can be tracked to identify API calls associated with the same application transaction. For example, a data field observed in a database query being sent back as return data from a web server in a data field of a JSON object. The API classification process includes a data field classifier 94 and an App transaction event generator 93. API transaction labels generated by the API classification process are used to identify a common application session of an application transaction event.

In some embodiments, the classification process takes place in both the data receptor that extracts data from the data source (e.g., a virtual interface sniffer) and the central data processor (e.g., a Point of Presence in a data center) to which multiple receptors are sending filtered data. A data processor not only correlate data from a single data receptor over time but also correlate data from multiple data receptors.

More specifically, raw data such as HTTP Requests and Responses were captured by the data receptor 84. These raw data are first grouped by a session estimator 86. A set of rules are used to determine whether a specific message exchange is part of a local session (e.g. using the normal 5-tuple plus certain HTTP cookie value). Custom session estimate rules can also be applied. The session estimator 86 is the first filter, so that data reduction filter 87 can be applied to eliminate most of the irrelevant data such as static content download, cacheable object downloads, and other repeated requests. A local session is useful even when data reduction is enforced as the session object can contain important metrics such as flow count, static data download, error and retry counters and other parameters.

Session objects or API call data are then sent to the data processor 92 where local sessions from multiple receptors can be correlated into a single App session at the correlation module 96. One such example is a front-end service monitoring data receptor capturing an end-user request. Such request can be correlated with a back-end message bus monitoring data receptor. These information is then sent to a data field classifier 94. One approach to correlate the local sessions from a single data receptor or multiple data receptors is by building a frequency distribution of the similarities between the data values assigned to a pair of data keys or variables being passed around across various sessions. The frequency distribution can be clustered to find the data keys which correlate with each other across local sessions.

The data field classifier can use either one or both modules: the predefined label module configured by human input in an assisted learning manner and an automated classifier leveraging existing data categorization (e.g. US postal address identification, human language input detection, etc.). The combined results of these classifier turn opaque data fields of raw data objects (e.g. a key named "k" in a JSON object capture) into meaningful "labels" (e.g. "account type"). Once identified, the data field and label mapping 95 are saved to short-cut the labeling of data field in future similar flows. In addition, the categorization and labeling is applied to the correlated data keys derived during the correlation of local sessions.

In some embodiments, assisted learning labeling rules 97 may be provided to improve the data field classification. The assisted learning process will be described in more detail below.

In some embodiments, the data field classification process for classifying the API call may be carried out as follows. The data field classification process operates to add labels/annotations to various data fields in the API call data. First, the data fields in the API call data are parsed for transaction information hints. Then, session data are grouped based on parameters such as timestamp, custom URL pattern, and object ID reference. The data field classification may then look-up pre-defined labels. The data field classification may also run automatic text classifier on un-annotated fields. The data field classification may apply pre-defined and automatic classifier data to correlated fields. Transaction metadata are generated and the API transaction is therefore annotated.

The result of the data field classification is a series of data field exchanges grouped together to form an App Transaction. Metadata such as the transaction actions, user information, App instance information, are all added to make App Transaction meaningful. The labeled flows are then provided as the App transaction events. The App transaction event generator 93 then generates the API specification for the API call which can then be used for the data capture and API activity flow processing.

In FIG. 8, the API call recognition process is not explicitly shown but it is understood that the data receptor can include the API call recognition process to identify known API calls and to direct known API calls to API activity flow processing, as discussed with reference to FIG. 7.

Figure 9:
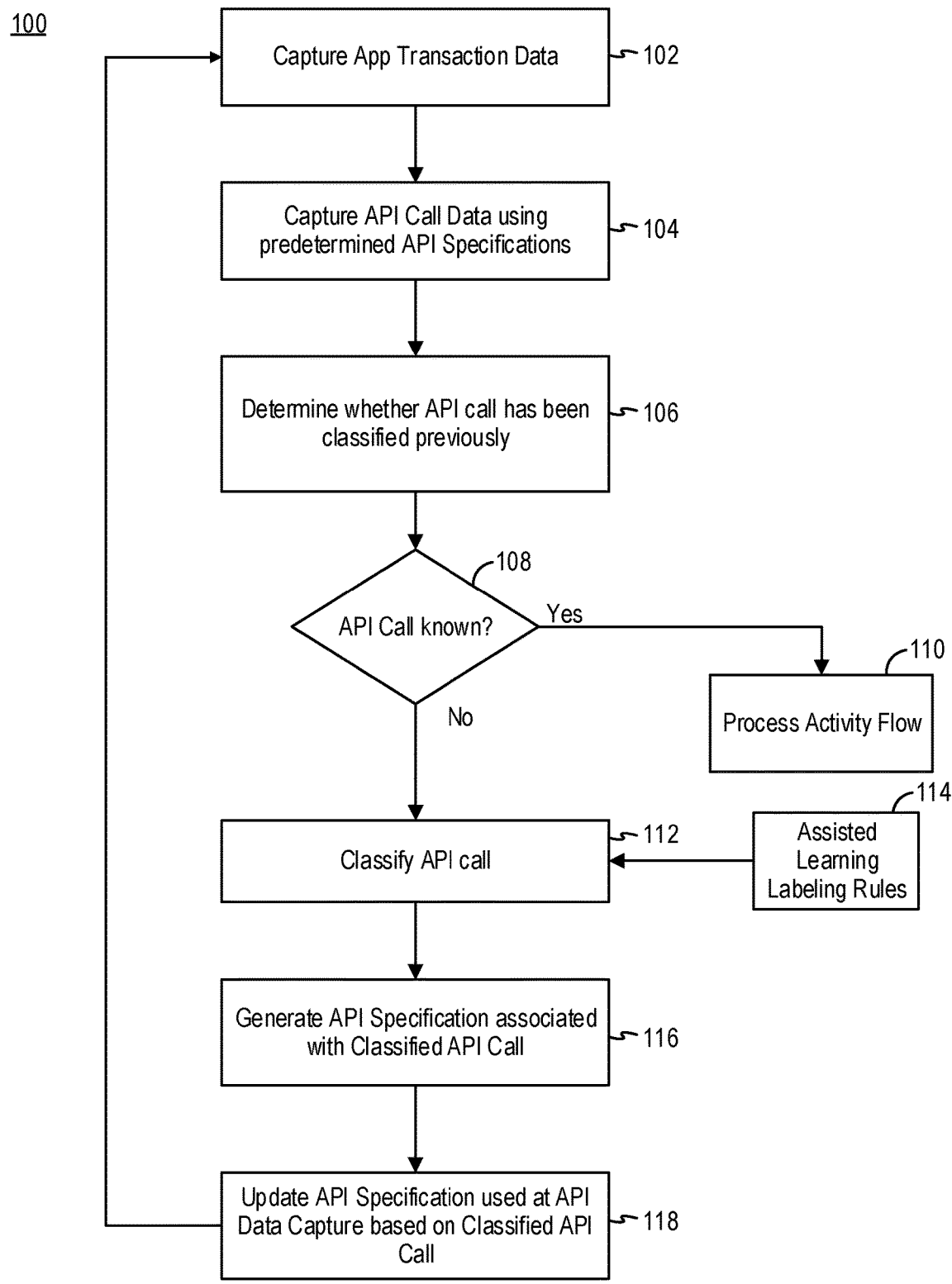
FIG. 9 is a flowchart illustrating an application security method in some embodiments.

FIG. 9 is a flowchart illustrating an application security method in some embodiments. Referring to FIG. 9, an application security method 100 starts by capturing application transaction data from network transaction data being received (102). The method 100 then captures or identifies API call data from the application transaction data using rules derived from predetermined API specifications (104). The method 100 then determine whether the API call has been classified previously (106). In response to determining that the API call is known (108), the method 100 then proceeds to process the API activity flow for session correlation and policy enforcement (110).

In response to determining that the API call is unknown, the method 100 then proceeds to classify the API call (112). In some embodiments, the method 100 may receive assisted learning labeling rules to assist in the classification (114). In other embodiments, the method 100 may perform automated classification. The method 100 then generates API specification associated with the classified API call (116). The method 100 then update the API specifications at the API data capture process (118). The method 100 may add to the predetermined API specifications or may modify existing API specifications. The method 100 repeats to continuously capture application transaction data and to continuously classify unknown API calls to generate the corresponding API specifications.

Figure 10:
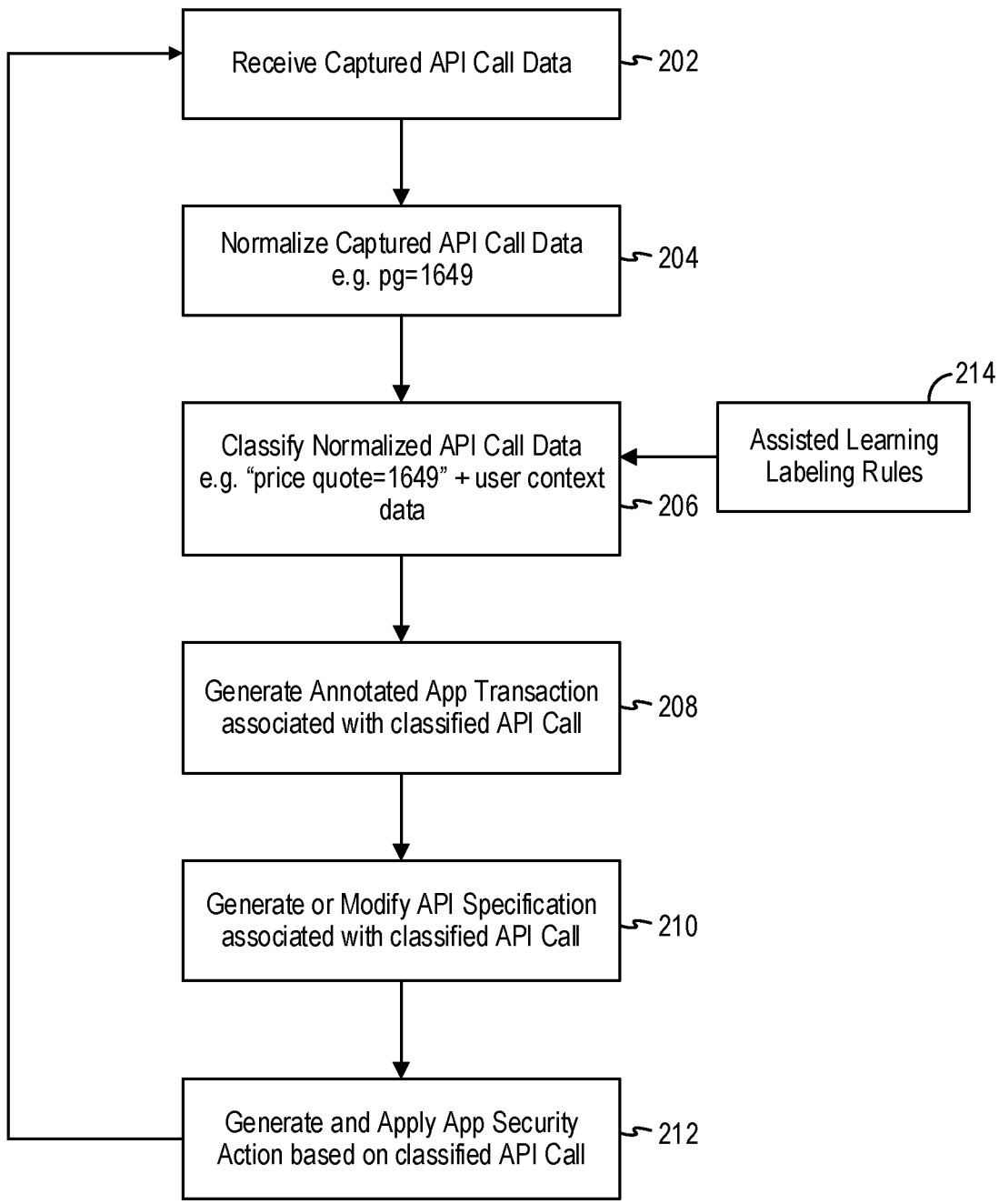
FIG. 10 is a flowchart illustrating a method of classifying API call data in some embodiments.

FIG. 10 is a flowchart illustrating a method of classifying API call data in some embodiments. As described above, an enterprise application exposes one or more APIs for users to interact with the application. Once the API is exposed, users may interact with the application by conducting application transactions containing input/output data (API transactions). For example, users may utilize a browser and enter a URL to reach a web page form corresponding to a cloud-based application, and then enter data into data fields displayed on the web page. When an API transaction has taken place—for example, once the users have finished entering data and started to submit the data—the method 200 receives captured API call data associated with the application network transactions (202). The API call data may be captured and identified using data receptors. The type of data receptor and the corresponding data acquisition method depends on where the API call level data can be found. Certain applications may already generate API logs and make them directly available for use (for example, Amazon's Amazon Web Services generates and provides to users detailed API logs, called CloudTrail). In these situations, the API logs may be directly obtained from the application. However, the majority of existing applications do not generate logs detailed to the API level. In those cases, a data capture function or an API input capture process is implemented. Network packet capture is one example of data capture. A data capture function can be implemented in inline mode or in network tap mode. The network tap does not need to be a physical tap but can be a virtual tap implemented in software. The implemented data capture function handles basic network protocols and process application layer protocols such as HTTP. In another example, data capture can be done by implementing a consumer service of a message bus used by some application as communication channel.

The API input capture process turns the API call data in the form of data capture or API logs into normalized API call data so that it is useable by the API classifier (204). The normalization process turns the data capture or API logs (which may include HTTP request/response headers/payload, or a message bus basic message in message bus format) into a series of key-value pairs, and may also add context data in the form of key-value pairs, e.g., user information of the user who initiated the transaction, geo-location info, etc. Once the normalization process has finished, the API classifier then generates API classifications based on the normalized API call data (206). In generating the API classifications, the API classifier may use a combination of assisted learning rules (214) and automated classification.

An API call is classified by the API classifier based on the (normalized) API call data. API call data is most often stored in key-value pairs for flexibility and/or readability. An example of data stored as a key-value pair is "a=Sample Account 1," where the account name is stored as the value "Sample Account 1," with "a" being the key, i.e. the unique identifier, indicating that an account name value is stored in the key-value pair. However, a conventional application security monitor extracting that key-value pair may not be able to interpret what "Sample Account 1" means from just this value, and the key "a" would likely not provide enough information to indicate that the value attached to that key is an account name. A conventional application security monitor may not be able to extract the value "Sample Account 1" as the value for an account because it uses the generic key "a". Only the application service itself would have the information to look for the account name with the key "a". The main goal of classification is hence to attach meaningful labels to a generic key derived from historical record of values.

The API classification process is an iterative process. As new data becomes available, the classification process will repeat itself and revised classification results will continue to improve the accuracy of the identification of relevant data fields in API transactions. For example, the API call data collected by the data capture or API log extraction process may be aggregated and stored in the API classifier until there is a large enough sample size. Once enough data is collected, based on a predefined sample size, the automated algorithm processes the data to draw conclusions. Alternatively, the automated algorithm may process the data as it comes in and attempt to draw conclusions, rather than collecting data and waiting until it meets a predefined sample size. In any case, the automated algorithm may conduct cluster analysis to group same or similar kinds of key-value pairs together. In one example, the algorithm could identify that the values in a group of key-value pairs are postal addresses, and then classify the key which is common to that group of key-value pairs as a "postal address" key.

In another example, some data fields do not conform to predefined rules or conform to certain patterns. For example, when uploading a file or an image, the actual file/image content is transferred in numerous data segments the value of which does not follow any particular pattern. However, almost all upload transactions follow similar behavioral patterns. These patterns can be used by cluster analysis to automatically determine if a series of data transfer is likely the result of a file/image upload. In order to improve the accuracy of behavioral pattern match, known application behavioral patterns are pre-arranged according to the application categories. New applications within the same category can be evaluated using the known behavioral patterns of known applications in the same category. In this description, this method is referred to as clustering application personality matching. In one example, API transactions that would qualify as the same or similar kind include a key-value pair with the same or similar key and/or value, or an application that uses the same library, but installed on a different URL (e.g., in multitenant situations where API classification has been successfully run for one tenant, the same API classification can be applied to another tenant).

In some embodiments, the API classification process uses one or more machine learning technique, such as data clustering, to the value part of the key-value pairs of the API call data to infer meaning of opaque or unknown API keys, implementing automated label generation for the API specification for the API associated with the API call data.

Under some circumstances, privacy concerns may arise, raw data cannot be stored in permanent storage or forwarded to a central location. As another embodiment, rather than aggregating and storing raw data, the API call data may be processed individually as they are collected, a similarity score against a known data set updated, and the API call data discarded before another piece of data is collected. For example, the similarity score may indicate how similar an unknown key is to a known key, based on how closely the input value corresponding to the unknown key matches values corresponding to the known key.

In an embodiment of the present invention, automated classification is always running, but special input for a particular key, provided by assisted learning labeling rules, if present, always overrides automated classification of the key.

The above examples are non-limiting, and the automated algorithm may also utilize other techniques to classify the API call data, such as natural language processing (NLP) sentiment analysis.

Once the API classifier has generated the API classifications, the method 200 generates annotated transaction event associated with the classified API call (208). In other words, the API classification result is a "description" of the App transaction API. Classified API, along with corresponding original input data, is stored—e.g. on the application security microscope or the device it is running on. The method 200 generates or modifies API specification associated with the classified API call (210). The method 200 may further generate or apply application security policy action based on the classified API call (212). For example, certain API transaction may be blocked. The method 200 may continue to capture another API call data and perform the classification of the API call data.

In some embodiments, the annotated App transaction can be provided to a security administrator for review. The security administrator Interface not only allows the security admin to view the data, but also to take action or apply security policy based on the API classifications/transaction data. For example, the security administrator can adjust the API classification by the process of assisted learning to be described below, to refine the API classification. In addition to transaction data visibility and refinement of API classification, the security administrator interface also allows the security administrator general control and management over the application security microscope, such as visibility of network device statuses, etc. The security administrator interface may be, for example, a web interface running on the device operated by the security administrator, but is not limited thereto.

Furthermore, the security administrator may directly (through the security administrator interface) or indirectly (via the API classification module) invoke an application security policy action. The security administrator directly invoking an application policy action through the security administrator interface allows the blocking of certain API transactions using the API classification. An application policy action can be invoked indirectly through the API classification Module to set up an automatic policy action to be taken elsewhere for future API transaction of the same or similar kind, rather than an action taken in the path of the API transaction.

In particular, the API classification allows the API input capture process to properly and accurately locate the data fields within a particular App transaction. For example, when a customer record is being updated, the App security policy action module evaluates the policies defined against future transaction to take actions when a match occurs. For example, if a policy is defined to send alert when a customer record's credit card information is being updated, the API classification will inform the API input capture process where to look for the credit card information. Then, the security policy action module is applied to those identified APIs.

The App security policy action module can take different actions depending on the security administrator's interactions with the security administrator interface. For example, if the data capture component is deployed inline with the network traffic, the App security policy action module can drop a network connection directly. The App security policy action module can also invoke the backend/admin API exposed by the network application to take other actions such as revoking an end user's privilege, suspending an end user, cancelling an order, etc.

Figure 11:
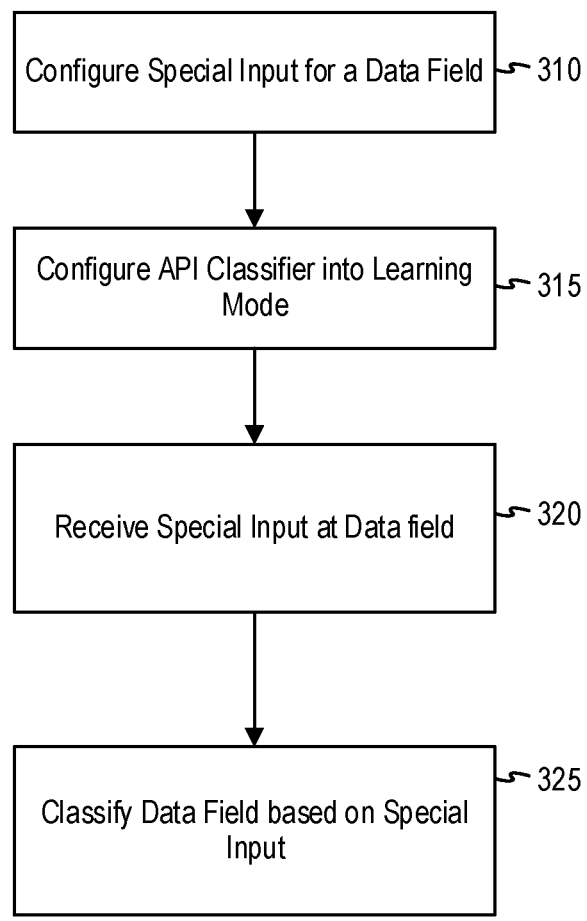
FIG. 11 illustrates a method of classifying API call data using assisted learning according to some embodiments.

FIG. 11 illustrates a method of classifying API call data using assisted learning according to some embodiments. As described above, the API classifier may use assisted learning to classify the API call data, e.g., determine the meanings of key-value pairs in a data field. Referring to FIG. 11, a method 300 first configures certain special input for a data field (310). The special input is sometimes referred to as an assisted learning language and is used for training the API classifier to learn certain key-value pairs for various data fields. The method 300 then configures the API classifier into learning mode to accept the special input or the assisted learning language (315) for a particular data field. In some embodiments, the API classifier can be configured by the security administrator through a security administrator interface to accept assisted learning input. The method 300 then receive the special input at the data field which used to teach the API classifier the meaning of the key in the key-value pair of the data field (320). The method 300 then classifies the data field based on the special input (325). In other words, the method 300 annotate the key in the key-value pair of the data field using the special input.

In one embodiment, after the API classifier is configured into learning mode, a test user enters the special input into the data field of the application. In particular, the test user will enter the special input into the data field the test user would like the API classifier to track, there by teaching the API classifier that the specific data field with a matching key would be the one to track in the future. The API classifier is put into learning mode after the special input configuration is provided. That way, in the learning mode, the API classifier can look for the special input.

The assisted learning labeling rules can be applied to the API classification step 112 in the method of FIG. 9. In that case, the API classifier is put in the learning mode to receive the assisted learning labeling rules as special input. When assisted learning is completed, the API classifier may resume automatic classification process.

In some embodiments, the special input is encapsulated with two special symbols "$" which have been configured by the security administrator as instructions to the API classifier to classify a key as corresponding to the encapsulated string value, i.e., that the key indicates a specific type of data field determined by the test user's special input value. Taking the prior example of an account name key-value pair, a test user could enter the special input "$account name$" into the account name field of an application, such that the corresponding key-value pair for the input would show up as "a=$account name$." The encapsulation of the value with the "$" symbols would trigger the API classifier to learn that the key "a" is a field of the type indicated by the test user's input value, i.e., "a" is a key classified as an "account name" field. Subsequently, when the API classifier extracts further API call data from a user, for example "a=ABC Corp.," the API classifier will know by virtue of the key "a"—which has already been classified as an account name key—that the value "ABC Corp." is an account name.

The assisted learning language has rich syntax providing additional functionality to that described above. In the above example, the test user could instead input "$account name/l=100, t=str$" to not only teach the API classifier that the field is an account name, but also that it is a string type variable (as indicated by t=str) with a maximum length of 100 characters (as indicated by l=100). In another example, a test user can encapsulate special input with "%pp%" so as to trigger password protection rules for a password field, such as default password alerting. The commands outlined above are non-limiting examples; actual commands may be invoked with different characters, and/or may have different or additional functionalities, including those well-known in the art.

Certain applications limit the input in their fields such that a test user is not able to enter special input in the syntax of the assisted learning language, e.g., the field may be a numeric field which only allows inputs that are comprised of Arabic numerals from "0" to "9." Such restrictive fields may prohibit or render impractical entering special input with the assisted learning language. However, the API classifier can still classify one field with the inputs a test user enters in a sibling field. For example, a test user may be filling out data fields in a web page form (e.g., a sales automation tool web page), where the first data field is a numeric field for entering a price quote that only takes Arabic numerals, and the second field is a comment field that can take both numerals and text as input. The test user would like to input "$price quote/t=int+$" into the price quote field to teach the API classifier that that specific field is indeed a price quote field, where the value is a positive integer (as indicated by t=int+). However, the price quote field does not allow such input, since it only takes in numerals. Instead, the test user may input "$%price quote/v=1111, t=int+%$" into the comment field, and "1111" into the price quote field. The input in the comment field indicates that the field in the application with the numerical value 1111 (as indicated by v=1111) should be classified as the price quote field and is a positive integer (as indicated by t=int+), and because the input in the price quote field matches with the numerical value 1111, the API classifier appropriately denotes that specific field as the price quote field. In other words, a special input in a first field can be leveraged to teach the API Classifier the meaning of a second field, even when the second field does not allow a test user to enter the desired special input.

Furthermore, automated classification may be provided in conjunction with assisted learning and helps provide classification for applications where it is not wholly feasible to provide a complete classification by special input. Automated classification may be accomplished by the API classifier running an automated algorithm, which may be one of a machine learning algorithm, Data Loss Prevention (DLP) pattern recognition technology, natural language processing (NLP), or a combination thereof. Such classification algorithm allows types of a data field to be automatically generated from the values gathered from past transactions. For example, when processing data input to a messaging application, if the natural language processing (NLP) algorithm determines that a particular value of a data field is highly likely a sentence generated by a human being, the type "message body" will be assigned to the corresponding key automatically.

In another example, certain data value follows pre-defined format rules such as a social security number, a credit card number, or a US postal address. These rules have been widely in use to achieve data loss prevention (DLP). These rules can also be applied in the API classification process to automatically determine the type of the data field. The type of the data field can then be used to further determine a meaningful label for the field based on the application category and context.

In some embodiments, the security administrator may use the security administrator interface to configure test user special input—based on what user input is expected to look like—which will be processed by the automated algorithms during automated classification.

In some embodiments, a special input may be used to assist in correlating multiple API calls belonging to the same application session of an application transaction event. For example, a system administrator may use a special input format to enter a session identifier as special input data to the API classifier. The API classifier, using the session identifier special input, generates annotated API transactions to correlate API call data from multiple API calls that belong to a common application session of an application transaction event.

Various embodiments of the present invention may be implemented in or involve one or more computer systems. The computer system is not intended to suggest any limitation as to scope of use or functionality of described embodiments. The computer system includes at least one processing unit and memory. The processing unit executes computer-executable instructions and may be a hardware processor or a virtual processor. The computer system may include a multi-processing system which includes multiple processing units for executing computer-executable instructions to increase processing power. The memory may be volatile memory (e.g., registers, cache, random access memory (RAM)), non-volatile memory (e.g., read only memory (ROM), electrically erasable programmable read only memory (EEPROM), flash memory, etc.), or combination thereof. In an embodiment of the present invention, the memory may store software for implementing various embodiments of the present invention.

Further, the computer system may include components such as storage, one or more input computing devices, one or more output computing devices, and one or more communication connections. The storage may be removable or non-removable, and includes magnetic disks, magnetic tapes or cassettes, compact disc-read only memories (CD-ROMs), compact disc rewritables (CD-RWs), digital video discs (DVDs), or any other medium which may be used to store information, and which may be accessed within the computer system. In various embodiments of the present invention, the storage may store instructions for the software implementing various embodiments of the present invention. The input computing device(s) may be a touch input computing device such as a keyboard, mouse, pen, trackball, touch screen, or game controller, a voice input computing device, a scanning computing device, a digital camera, or another computing device that provides input to the computer system. The output computing device(s) may be a display, printer, speaker, or another computing device that provides output from the computer system. The communication connection(s) enable communication over a communication medium to another computer system. The communication medium conveys information such as computer executable instructions, audio or video information, or other data in a modulated data signal. A modulated data signal is a signal that has one or more of its characteristics set or changed in such a manner as to encode information in the signal. By way of example, and not limitation, communication media includes wired or wireless techniques implemented with an electrical, optical, RF, infrared, acoustic, or other carrier. In addition, an interconnection mechanism such as a bus, controller, or network may interconnect the various components of the computer system. In various embodiments of the present invention, operating system software may provide an operating environment for software executing in the computer system, and may coordinate activities of the components of the computer system.

In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Various embodiments of the present invention may be described in the general context of computer-readable media. Computer-readable media are any available media that may be accessed within a computer system. By way of example, and not limitation, within the computer system, computer-readable media include memory, storage, communication media, and combinations thereof.

Having described and illustrated the principles of the invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

What is claimed is:

1. A method for monitoring and classifying application transaction data, and enforcing data security policy based on the classification of the application transaction data, the method comprising:
   receiving application transaction data transferred to an application through application programming interface (API) calls made to an API exposed at an API gateway, the application transaction data comprising API call data, wherein the application or the API exposed at the API gateway is unknown to the API gateway;
   identifying API call data in the application transaction data using rules derived from one or more API specifications known by the API gateway and determining that the API call data does not match with any of the one or more API specifications;
   in response to determining that the API call data does not match with any of the one or more previously generated API specifications, classifying the API call data using one or more automatic classification methods;
   in response to the classifying, generating an API specification for an API call from the API calls corresponding to the API call data and generating a security policy action to implement API security measures for the application transaction data;
   updating the one or more known API Specifications by adding the generated API specification for the API call to the one or more known API specifications at the API gateway; and
   in response to the generating, processing the application transaction data including the API call for security policy enforcement at the API gateway by applying the security policy action to the application transaction data.

2. The method of claim 1, further comprising:
   determining that the API call data match a first API specification known by the API gateway; and
   in response to determining, processing the application transaction data including the API call for security policy enforcement at the API gateway based on the first API specification.

3. The method of claim 1,
   wherein the updated known API specifications are applied to identify subsequent API call data.

4. The method of claim 1, wherein classifying the API call data using one or more automatic classification methods comprises:
   classifying the API call data using one or more automatic classification methods to automatically infer API transaction labels in key-values pairs of the API call data.

5. The method of claim 4, wherein classifying the API call data using one or more automatic classification methods comprises:
   classifying the API call data using one or more of machine learning classification methods, the machine learning classification methods including one or more of clustering, natural language processing and pattern recognition techniques.

6. The method of claim 1, wherein classifying the API call data using one or more automatic classification methods comprises:
   receiving a special input to configure the classifying into an assisted learning mode; and
   in response to configuring the classifying into the assisted learning mode, applying a parameter value in the special input to annotate a label of a data field in the API call data.

7. The method of claim 1, wherein classifying the API call data using one or more automatic classification methods comprises:
   annotating data fields of the API call data of the application based on similarities to applications known to the API gateway where the known applications are in the same application category.

8. The method of claim 1, wherein receiving application transaction data transferred to an application through application programming interface (API) calls made to an API exposed at an API gateway comprising
   receiving the application transaction data using one or more data receptors deployed at the API gateway.

9. The method of claim 8, further comprising:
   deploying the one or more data receptors as one or more of proxy extensions, as network taps, at edge devices, as sidecar containers, and as message bus consumers.

10. The method of claim 1, further comprising:
    arranging known behavior patterns of one or more known applications according to application categories; and
    automatically annotating data fields of the API call data of unknown applications based on similarities to known applications where the unknown applications and the known applications are in the same application category.

11. The method of claim 1, further comprising:
    correlating API call data from multiple API calls forming an application transaction event; and
    using API transaction labels generated using the automatic classification methods to classify the API call data from multiple API calls that belong to a common application session of an application transaction event.

12. The method of claim 6, further comprising:
    receiving a special input being a session identifier to generate annotated API transactions to correlate API call data from multiple API calls that belong to a common application session of an application transaction event.

13. A computer-implemented system for monitoring and classifying application transaction data, and enforcing data security policy based on the classification of the application transaction data, the system comprising:
a hardware processor; and
a memory coupled with the hardware processor, wherein the memory is configured to provide the processor with instructions which when executed cause the processor to:
receive application transaction data transferred to an application through application programming interface (API) calls made to an API exposed at an API gateway, the application transaction data comprising API call data, wherein the application or the API exposed at the API gateway is unknown to the API gateway;
identify API call data in the application transaction data using rules derived from one or more API specifications known by the API gateway and determine that the API call data does not match with any of the one or more API specifications;
in response to determining that the API call data does not match with any of the one or more previously generated API specifications, classify the API call data using one or more automatic classification methods;
in response to the classifying, generate an API specification for an API call from the API calls corresponding to the API call data and generate a security policy action to implement API security measures for the application transaction data;
update the one or more known API Specifications by adding the generated API specification for the API call to the one or more known API specifications at the API gateway; and
in response to the generating, process the application transaction data including the API call for security policy enforcement at the API gateway by applying the security policy action to the application transaction data.

14. The system of claim 13, wherein the memory is further configured to provide the processor with instructions which when executed cause the processor to:
determine that the API call data match a first API specification known by the API gateway; and
in response to determining, process the application transaction data including the API call associated with the first API specification for security policy enforcement at the API gateway.

15. The system of claim 13, wherein the memory is further configured to provide the processor with instructions which when executed cause the processor to:
apply the updated known API specifications to identify subsequent API call data.

16. The system of claim 13, wherein the memory is further configured to provide the processor with instructions which when executed cause the processor to:
classify the API call data using one or more automatic classification methods to automatically infer API transaction labels in key-values pairs of the API call data.

17. The system of claim 16, wherein the memory is further configured to provide the processor with instructions which when executed cause the processor to:
classify the API call data using one or more of machine learning classification methods, the machine learning classification methods including one or more of clustering, natural language processing and pattern recognition techniques.

18. The system of claim 13, wherein the memory is further configured to provide the processor with instructions which when executed cause the processor to:
receive a special input to configure the classifying into an assisted learning mode; and
in response to configuring the classifying into the assisted learning mode, apply a parameter value in the special input to annotate a label of a data field in the API call data.

19. The system of claim 13, wherein the memory is further configured to provide the processor with instructions which when executed cause the processor to:
annotate data fields of the API call data of the application based on similarities to applications known to the API gateway where the known applications are in the same application category.

* * * * *